Jan. 13, 1970    J. U. GELLERT    3,488,810
VALVE-GATED MOLD CONSTRUCTION
Filed March 17, 1967    2 Sheets-Sheet 1

INVENTOR
JOBST V. GELLERT
BY
ATTORNEY

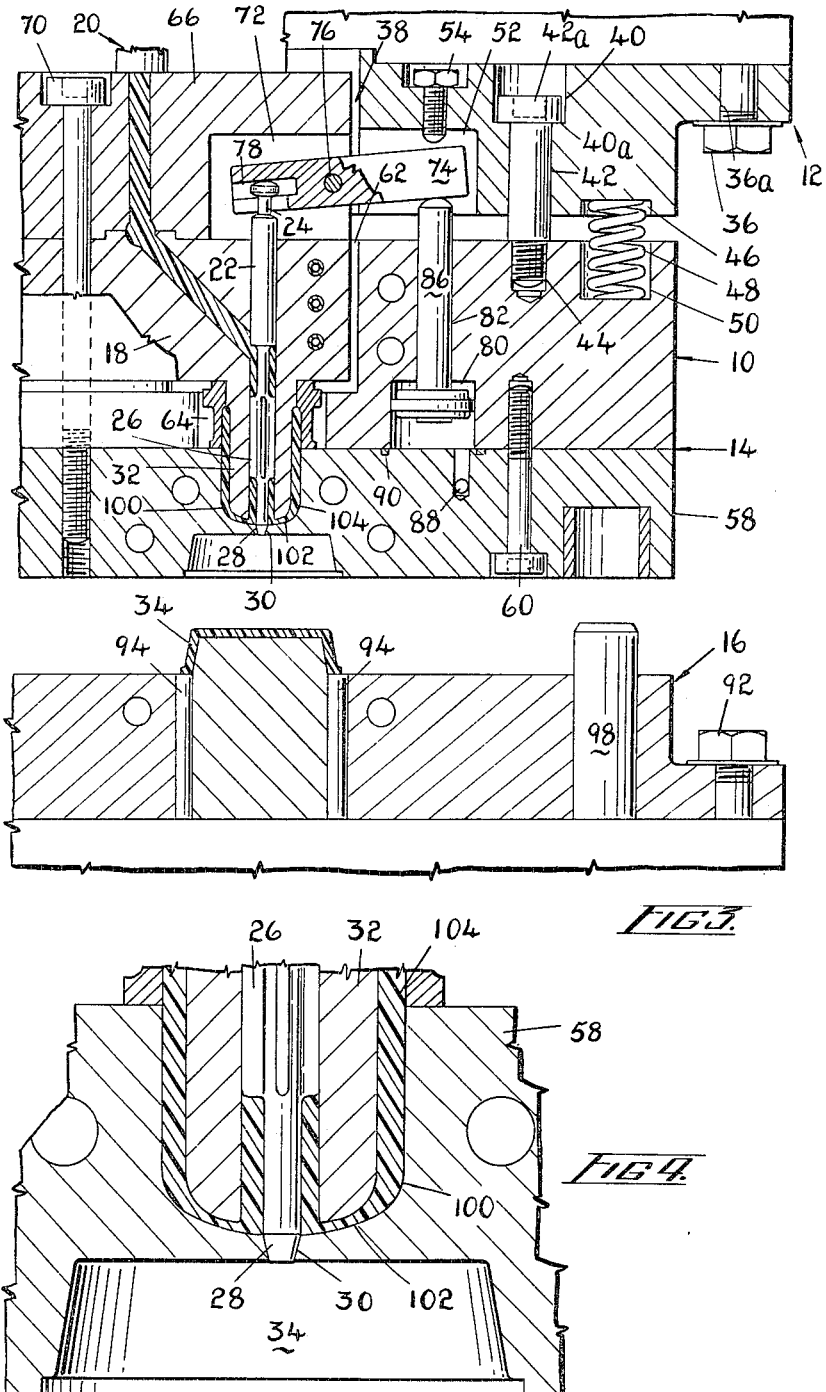

United States Patent Office 3,488,810
Patented Jan. 13, 1970

3,488,810
VALVE-GATED MOLD CONSTRUCTION
Jobst U. Gellert, 227 Viewmount Ave.,
Toronto 19, Ontario, Canada
Filed Mar. 17, 1967, Ser. No. 624,097
Int. Cl. B29f 1/03
U.S. Cl. 18—42         7 Claims

ABSTRACT OF THE DISCLOSURE

This invention discloses a mold assembly especially constructed for use with valve-gated hot runners in the injection molding field.

Basically, the mold assembly is extremely compact and permits the use of a molding cycle which includes an interrupted opening stroke of the movable platen of the molding machine.

It is during this interrupted stroke that the valve-gate mechanism is actuated.

By using the particular construction set forth, the mold assembly of the invention can be used with most modern injection molding machines regardless of the latter's limitations as regards mold shut-height.

---

This invention relates in general to apparatus for carrying out injection molding in the plastics field.

More particularly, the present invention relates to the construction of mold assemblies, especially those adapted for use with hot runners.

As the reader skilled in this art will appreciate, one of the main faults in articles manufactured by injection molding is the formation of gate marks which, in many instances, creates the expensive problem of further processing to produce a desirable product free from any flaws.

In an effort to reduce the incidence or magnitude of gate marks, sprues, solidified runners, etc., the art has turned to hot runner molding and relatively recently to the more sophisticated hot runner valve-gate molding technique where a valve stem is carried within an injection nozzle, such stem being normally biased into closed or seated position and opened and closed in response to injection pressure or independent means.

This invention, however, relates to a mold construction where the actuation of the valve stem is based on a different concept of molding cycle generally known.

A review of prior valve-gating art reveals that the commonly known molding cycle is used and in which the actuation of the valve stem takes place.

The present invention, however, is directed to a simpler, less costly and more compact approach to the valve-gating technique using a molding cycle including an interrupted opening stroke of the movable platen of the molding machine. The commonly known injection molding cycle is the following:

The mold closes and is locked by a machine clamp force; the injection of the molten plastic material then takes place. After filling the cavities for a fraction of the cycle time the mold is held in closed position and the injection ram holds its forward position for maintaining pressure in the cavity. Then the ram retracts and the mold stays closed under the clamp force until the molded part has solidified. At this time, the mold opens and the molded part is ejected thus completing a full cycle.

In the new valve-gating cycle to be described herein, the actual mold closed-time at the parting line as divided into two stages. The first stage is where the clamp force locks the mold to withstand the injection pressure, and a second stage which is triggered simultaneously with, or after, retraction of the injection ram. With the beginning of the second stage, the machine relieves its pressure lock on the mold and the clamp platen of the machine moves a pre-determined amount of its opening stroke, permitting the mold assembly to open *behind the parting line* thus creating the space required to actuate the closing of the valve-gate. In this position the cavity forming portions of the mold remain closed until the molding is cooled down enough for ejection. Only then does the clamp complete its opening stroke.

As will be noted, with further reference to the prior art, one of the major problems is to maintain sufficient heat in the nozzle area to avoid clogging of the valve and formation of cold slugs.

To the applicant's knowledge, all present valve-gated devices include valve-stem actuating mechanisms which fail to decrease the shut-height of the mold which is often limited or fixed for any given machine.

The present invention sets forth a novel mold structure, relatively inexpensive and wherein the valve-stem actuating mechanism is constructed in such a manner as to avoid any increase in overall shut-height for a machine with limited mold shut-height.

A further advantage of the novel structure to be more fully described hereinbelow, resides in the fact that it can be employed with practically any of the machines marketed at the present time. It will be obvious upon inspection of the prior art structures that considerable machine-modifications are required in order to utilize the prior mold assemblies in current machinery.

As regards function, applicant's development permits actuation of a valve-stem, at the appropriate time, to produce substantially sprueless articles which are molded on machines of a newer or more recent design equipped with necessary instrumentation, if required, to automatically regulate the interrupted clamp-opening stroke.

The novel structure, or at least one embodiment thereof, will be more fully understood upon reading the following detailed description in conjunction with the appended drawings wherein:

FIG. 3 is a partial sectional view with the "core" section of the mold withdrawn, and FIG. 4 is a partial sectional view in an enlarged scale showing the nozzle of the hot runner inserted in the "hot" side of the novel mold assembly with the valve-stem in a seated position.

Figure 1:
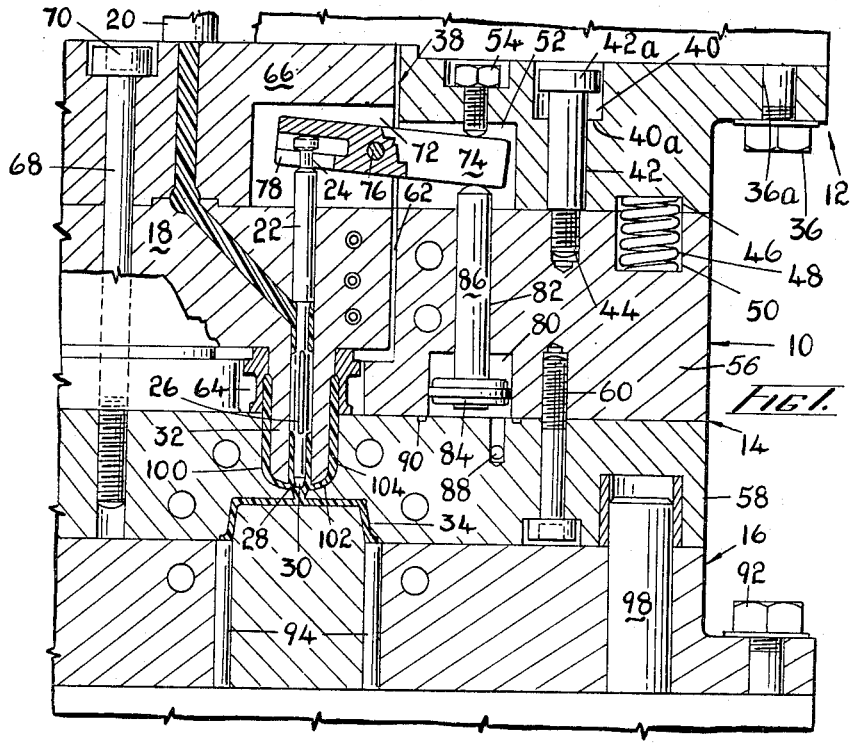
FIG. 1 is a partial cross-section view of a mold assembly according to the present invention, including a cross-sectional representation of an inserted hot runner element.

With initial reference to FIG. 1 an illustrative embodiment of a novel mold assembly 10 according to the present invention is shown as comprising an annular collar section 12; a hot-side mold half 14 and a complementary mold half 16. In the interests of clarity, a hot runner 18 is shown in assembled position with respect to the mold assembly 10 and a machine injection nozzle 20 is indicated in communication therewith to inject fluent plastic material into the hot runner as required and as programmed.

In this application, the hot runner 18 will not be described in complete detail. Such details are fully set forth in the present applicant's co-pending U.S. application, Ser. No. 487,385, filed on Sept. 15, 1965, now Patent No. 3,383,493, and entitled "Heater Block and Process for Producing Same."

The only difference between the hot runner 18 and that detailed in the above noted application resides in the provision of a valve-gate pin or valve element 22 having a necked and headed portion 24 for a purpose to be later described.

The pin 22 includes a desired torpedo section 26 and the lower end of the pin is tapered to form a frusto-conical valve 28 adapted for co-operation with a valve seat 30 formed in mold-half 14.

The valve pin is slidably mounted for reciprocating motion within the hot runner 18, as is now well known, to open and close the injection gate or valve seat 30 in nozzle 32 which is detachably connected to the hot runner or integrally formed therewith. The valve 28 thus controls flow of material to mold cavity 34 the latter being defined by the abutment of mold-halves 14 and 16.

With further reference to FIG. 1, it will be seen that the annular collar 12 is bored as at 36a, to receive mounting bolts 36 by means of which the collar is rigidly connected to the injection molding machine per se (not shown).

The inner dimensions of the collar 12 are such as to provide a slight air space 38 between the collar and the hot runner 18 after the final assembly step of mounting the collar is effected. The air space is, of course, provided to minimize heat losses from the runner.

At spaced intervals around the collar, a plurality of counterbored holes 40 are provided to slidingly accommodate heated pins 42 which threadedly engage in tapped holes 44 formed in mold-half 14.

In FIG. 1, it will be seen that with the collar 12 and mold-half 14 in abutment, the head 42a of headed pin 42 is spaced from the shoulder 48 formed in counterbored holes 40. Thus the mold-half 14 is mounted on the collar for limited sliding movement relative thereto.

Additionally, the collar 12 is bored as at 46 to provide a seat for a spring element 48, the other end of which seats in bores 50 formed in mold-half 14. With the collar and mold-half 14 in abutment, spring element 48 is placed under compression such that the mold-half 14 is constantly under a biasing force urging it away from the collar 12. The reason for this will become clear as the description proceeds. However, it will be appreciated that the springs could, of course, be replaced or eliminated by use of the pneumatic and/or hydraulic systems provided with all standard injection molding machines, or, alternatively, the spring could be mounted in surrounding relation with respect to headed pins 42.

Again, for a purpose to be fully described hereinbelow, the collar, by turning, milling, casting or by any other standard manufacturing process, is provided with at least one inner recess 52 which, in conjunction with the proximate face of mold-half 14 forms a cavity.

Extending into such recess 52 is the end of an adjustable member 54, the head of which is accepted within a counterbore formed in the collar.

As above noted, several points will be more fully described in due course. It is necessary for a complete and thorough understanding of the novel structure to ensure that the particular elements of each major sub-assembly be clearly pointed out before the inter-relationship can be readily and properly described.

Still remaining with FIG. 1, the mold-half 14 will now be described.

As shown, mold-half 14 comprises two sections 56 and 58 rigidly but detachably interconnected by recessed retaining studs 60. Section 56 is centrally recessed to permit insertion of the hot runner 18, the central recess being of such a dimension as to permit the formation of an annular, insulating air space 62 between the hot runner and the section 56. At spaced intervals, apertures 64 are formed in section 56 so as to permit introduction of the nozzles of the heated hot runner to the cooled cavity plate 58, to seal off injection back pressure as well as to provide sufficient insulation. A portion 66 including a main feed channel 68 clamps hot runner 18 to lower mold sections 56 and 58 by means of through bolts 70.

Portion 66 is recessed as at 72, each recess 72 being in communication with a respective cavity 52 formed in the collar 12.

Pivotally mounted in each recess 72 is a rocker arm 74, the pivot means 76 comprising a rod fixedly mounted in spaced, opposed walls of recess 72.

One end of rocker arm 74 enclosed in recess 72 is T-slotted to engage the necked and headed portion 24 of valve-gate pin 22 in a pivotable and sliding relationship. In brief, rocking motion of rocker arms 74, either in one direction or the other, will effect movement of the valve-gate pin, the headed end 24 of the latter having a combined sliding and pivoting motion relative to the rocker arm. The last mentioned element includes, of course, a slot 78, part of the T-slot, to permit insertion of the headed end 24 in the end portion of the rocker arm.

Axially aligned with the adjustable stud member 54, a piston chamber 80 is machined in section 56. Co-axial with chamber 80 and extending from communication therewith into communication with the inner cavity 52 of collar 12 is a piston stem bore 82.

Within the chamber in the bores, 80 and 82, respectively, a piston 84 and an integral piston stem 86 are slidably mounted. The piston is placed under pressure from air intermittently supplied by conduit 88 to bring piston stem 86 into contact with rocker arm 74, forcing the latter into selective contact with adjustable member 54.

In order to avoid leakage, conventional gasket means 90 are provided around the chamber 80 in either section 58 or section 56.

Finally, and again with reference to FIG. 1, mold-half or core-plate 16 is shown as being a more or less conventional unit adapted to be bolted securely to a movable machine platen (not shown) by bolts 92.

Mold-half 16 is fitted with ejector pins 94 or any other suitable stripping or ejecting means.

As is usual, the mold-halves 14 and 16 include guide pins 98.

At this point, substantially all but one feature, necessary for complete description and/or understanding of the invention, have been noted and it is not deemed necessary to cloud the inventive concept by entering into a detailed discussion upon matters such as mold cooling means, timing circuitry and the like. Such matters will be readily associated with the invention by those skilled in this art.

The last feature to be described in detail takes the reader back to mold-half 14.

It will be noted that section 58 is recessed at 100 to accept the hot runner nozzle. All component parts in this area are dimensioned such that a very narrow space 102 exists between the bottom of the nozzle 32 and the recess 100 while a relatively larger annular space 104 exists between the sides of nozzle 32 and the sides of recess 100. By means of such dimensioning and fitting, fluent material is permitted to fill the aforementioned space during injection operations and a highly efficient insulating barrier is formed whereby the desired heat is maintained in nozzle 32 at all times. The material which flows into the said spaces, due to injection pressures, is trapped and eventually becomes stale. However, it is easily removed upon dissassembly of the overall mold and, in fact, remains fluent under operating conditions. In effect, this insulating collar precludes the use of additional heating means.

It should be noted that in the particular instance where it is desirable to have but one injection nozzle attached to the hot runner for insertion in a mold assembly according to the present invention, modern injection machines provide sufficient space adjacent the main injection nozzle 20 and rearwardly of the hot-side mold platen to accommodate the valve-pin actuating mechanism or a portion thereof. In this case, the annular collar section 12 can be eliminated while the right-hand end of rocker arm 74 (as viewed in FIG. 1) can be attached to any suitable fixed portion of the machine per se. With further reference to this last-mentioned embodiment (not illustrated), the main feed channel extending from main injection nozzle 20 to the hot runner 18 can be staggered to permit central location of a nozzle 32 and its associated valve mechanism. In this instance, the more compact arrangement of mounting the biasing spring 48 coaxially with the counterpart of headed stud 42 could well be utilized.

Having described the various parts and several features of the mold of the present invention, the mode of operation of the illustrated embodiment will now be described.

FIG. 1 illustrates the mold with all its associated parts located in their respective positions during an injection stroke.

The two mold-halves 14 and 16 are in abutment and have been forced into contact with collar 12, thus compressing springs 48.

Simultaneously, stud member 54 has depressed rocker arm 74 against the pressure exerted by piston stem 86 thus raising valve-gate pin 22. The injection molding machine in response to a programmed cycle injects fluent material via nozzle 20 into hot runner 18 and thus into mold cavity 34, as well as into spaces 102 and 104, if this is considered as being an initial injection stroke following set-up.

As soon as the cavity 34 has been filled under pressure, the mold closing force, some 100 tons/sq. inch is substantially removed and the springs 48 force the still closed mold-halves 14 and 16 away from collar 12. Simultaneously, air pressure in conduit 88 forces the piston 84 and piston stem 86 to pivot the rocker arm 74 effecting closure of injection nozzle 32 prior to opening of the mold-halves and at a time when the material in cavity 34 is semi-solidified. The valve element 28 can be dimensioned and the throw thereof adjusted to ensure that the tip will stop flush with the mold cavity defining surface, or, in many instances where a slight mark is of no consequence, the valve can project slightly past the end of the seat 30 as best seen in FIG. 4.

After the actual injection pressure has been removed, there is little or no need for mold-clamping pressure.

Figure 2:
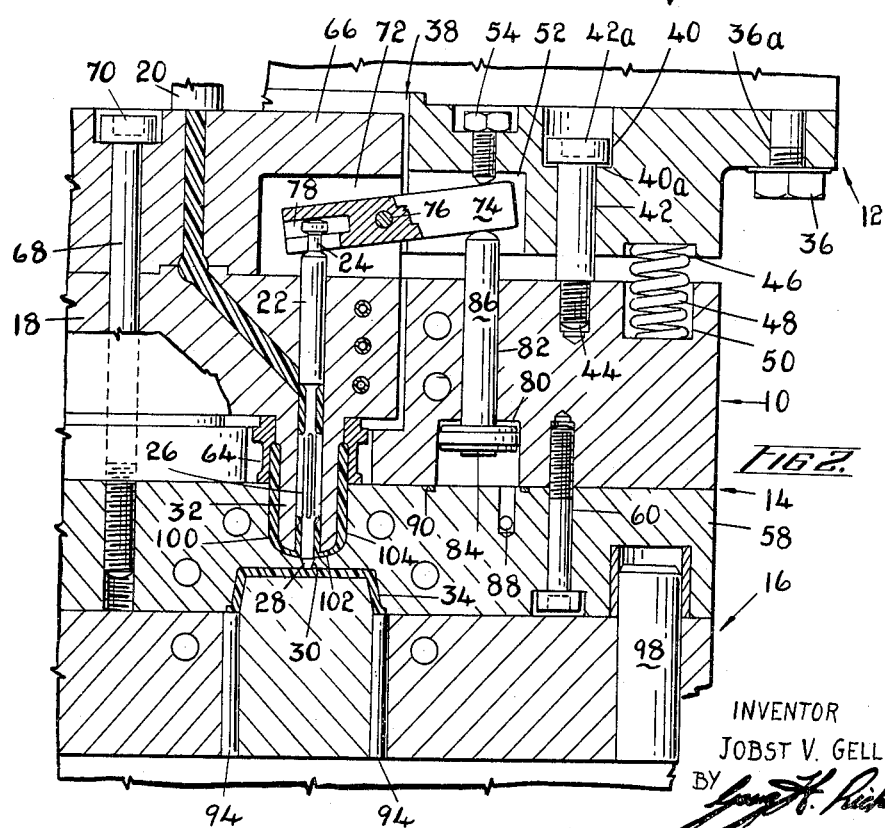
FIG. 2 is substantially the same as FIG. 1 but with the valve-stem shown in the closed position.

As best seen in FIG. 2, when the mold assembly per se has been forced away from the collar 12 by springs 48, the heads 42a of bolts 42 have not quite seated on the shoulders 40a. Due to slight variations of stroke, etc., in the subject machines, it is always advisable to permit a slight tolerance in and between moving elements whenever possible.

Turning to FIG. 3, the mold assembly is shown immediately prior to ejection, that is, with the mold-halves separated a sufficient distance for removal of the article molded.

The valve-gate pin cannot open until the mold-halves have again been brought into abutment and further pressure has been applied to overcome the spring force exerted by springs 48. Only when the sections 14 and 16, in abutment themselves, are brought into abutment with collar 12, will the valve-gate pin 22 open for a further cycle to be initiated.

To those skilled in this art, it will be obvious that the present applicant has set forth a mold assembly particularly characterized by compactness of design without, in any way, straining the ability of the pertinent component parts to maintain the desired heat concentrations. Further, the mold assembly according to the present invention requires no additional heater elements and can thus, in actual fact, be utilized in presently available injection machines. The modifications required to fit a mold assembly, such as has hereinbefore been described, to a modern injection molding machine are minimal. In addition, the costs involved in the manufacture of a mold according to the invention are relatively low in comparison with the cost incurred through manufacture of current, prior art types.

It will be readily perceived by those skilled in this art that many modifications and changes may be effected to the illustrative embodiments set forth herein. Consequently, the applicant wishes to be limited in his coverage only insofar as the scope of the appended claims.

What I claim as new and desire to protect by Letters Patent of the United States is:

1. A mold assembly for use with a hot runner in an injection molding machine, comprising,
   (a) a collar adapted to be mounted on the machine adjacent the main injection nozzle thereof;
   (b) a pair of mold-halves, adapted for intermittent engagement with each other to define a mold cavity, and mounted on said collar for limited reciprocating motion relative thereto;
   (c) resilient means located between the collar and the mold-halves operable to exert a biasing force against the mold-halves urging the latter away from the collar through a predetermined distance; and
   (d) means mounted in one of said mold-halves responsive to movement of the mold-halves relative to the collar to selectively effect actuation of a valve-gate pin reciprocally mounted in a nozzle in the hot runner, said means last-named comprises a mechanical linkage operable to engage the pin, said linkage being mounted in the said one mold-half for contact with the collar such that movement of the mold-half relative to the collar actuates the linkage and the valve-gate.

2. A mold assembly as defined in claim 1 wherein the portion of the mechanical linkage engageable with the valve-gate pin is T-slotted to permit slidable and pivotable engagement with a headed portion of the pin to reciprocate the latter between valve-open and valve-closed positions.

3. A mold assembly as defined in claim 1 wherein the mechanical linkage includes a rocker arm pivotally mounted on the said one mold-half; one end of the rocker arm being pivotally and slidably engageable with the pin, the other end of said rocker arm being in substantially constant contact with, and between, adjustable abutment means mounted in the said collar, and resilient biasing means mounted in the said one mold-half.

4. A mold assembly as defined in claim 3 wherein said resilient biasing means comprises a pneumatic motor element including an outwardly projecting stem, said stem being forced into contact with the rocker arm by air pressure from pressure lines carried by the machine.

5. A mold assembly as defined in claim 1 wherein said collar is provided with a plurality of counterbored guide-pin apertures and headed guide-pins fixedly connected to said one mold-half to retain the latter in slidable relation relative to the collar.

6. A mold assembly as defined in claim 1 wherein said one mold-half includes at least one recess operable to receive a hot runner nozzle, said recess terminating in a valve seat and being so configured and dimensioned as to form a substantially enclosed annular space around an inserted nozzle such that, in operation the annular space is filled with fluent injection material which acts as an insulator for the nozzle.

7. A mold assembly for use in an injection molding machine, comprising,
   (a) a pair of mold-half sections including a hot-side section and a core section;
   (b) said hot-side section including a hot runner element having at least one nozzle, each nozzle being valve-gated and including a reciprocable valve-gate pin; said hot runner being mounted in said hot-side section with each nozzle projecting into a cavity formed in the hot-side section for communication with a mold cavity formed by the abutment of the mold sections;
(c) a collar element releasably mountable on the injection molding machine in surrounding relationship to the main injection nozzle thereof, said hot-side section being mounted on the collar for limited motion relative thereto;
(d) means constantly urging the hot-side section away from the collar; and
(e) means mounted in said hot-side section responsive upon movement of the latter relative to the collar to selectively effect actuation of each valve-gate pin, said means last named comprising a T-slotted rocker arm pivotally mounted in the hot-side section; resilient means also mounted in the hot-side section operable to urge one end of said rocker arm into contact with an adjustable stop member mounted in said collar; the T-slotted end of the rocker arm being pivotally and slidably engageable with the upper end of the valve-gate pin.

References Cited

UNITED STATES PATENTS

| | | | |
|---|---|---|---|
| 2,558,027 | 6/1951 | Wilson | 18—42 |
| 2,578,719 | 12/1951 | Mayer et al. | 18—42 |
| 2,587,070 | 2/1952 | Spillman | 249—66 X |
| 2,770,011 | 11/1956 | Kelly | 18—30 |
| 2,828,507 | 4/1958 | Strauss | 18—30 |
| 2,865,050 | 12/1958 | Strauss | 18—30 |
| 2,883,704 | 4/1959 | Jurgeleit. | |
| 2,994,921 | 8/1961 | Hultgren | 18—42 |
| 3,023,458 | 3/1962 | Seymour | 18—30 X |
| 3,093,865 | 6/1963 | Peters et al | 18—42 |

FOREIGN PATENTS

| | | |
|---|---|---|
| 1,330,440 | 9/1963 | France. |

J. HOWARD FLINT, JR., Primary Examiner

U.S. Cl. X.R.

18—30